United States Patent [19]

Kahler

[11] Patent Number: 4,972,321
[45] Date of Patent: Nov. 20, 1990

[54] LATERAL AXIS ROLLOUT CONTROL FOR AIRCRAFT

[75] Inventor: Jeffrey A. Kahler, Phoenix, Ariz.

[73] Assignee: Honeywell Inc., Minneapolis, Minn.

[21] Appl. No.: 341,884

[22] Filed: Apr. 24, 1989

[51] Int. Cl.$^5$ .................. G06F 15/48; G06G 7/70; G05D 1/12; B64C 13/18

[52] U.S. Cl. ............................. 364/428; 364/447; 364/460; 342/33; 244/183; 318/583

[58] Field of Search .................. 364/424.01, 424.02, 364/428, 429, 436, 439, 440, 441, 460, 447, 453, 454; 342/33-35, 458; 244/175, 183, 184; 318/583, 585, 586

[56] References Cited

U.S. PATENT DOCUMENTS

| | | | |
|---|---|---|---|
| 3,417,945 | 12/1968 | Reynolds et al. | 244/184 |
| 3,739,382 | 6/1973 | Younkin | 244/184 X |
| 3,837,603 | 9/1974 | Schultz et al. | 244/184 |
| 3,918,662 | 11/1975 | Vircks et al. | 318/583 X |
| 3,989,209 | 11/1976 | Feintuch et al. | 244/184 |
| 4,006,870 | 2/1977 | Boone et al. | 244/184 |
| 4,354,240 | 10/1982 | Olive | 364/447 X |
| 4,460,858 | 7/1984 | Ashland | 318/585 |
| 4,482,961 | 11/1984 | Kilner | 364/428 |
| 4,533,999 | 8/1985 | Lambregts | 364/429 |

Primary Examiner—Parshotam S. Lall
Assistant Examiner—Edward Pipala
Attorney, Agent, or Firm—Arnold L. Albin

[57] ABSTRACT

Apparatus for guiding an aircraft along the center line of a runway at rollout touchdown. A rollout predict path command is generated in accordance with a first path segment $$Y_1 = T_1(Y_m + Y_u)(1 - e^{-t/T_i}) - Y_m t + Y_i$$

on engaging rollout mode, which path segment transitions to a second path segment $$Y_2 = Y_1 e^{-(t-t_o/T_1)}$$

at a given elapsed time $t_o$, where $T_1$ is a predetermined time constant, $Y_i$ is an initial value of lateral displacement on rollout engagement, $\dot{Y}_i$ is the time derivatives threeof, $Y_M$ is a predetermined maximum lateral displacement rate, and t is the elapsed time. The predict path command signal is combined with a rate signal derived from a localizer position estimate to produce an error signal for commanding a rudder deflection to align the aircraft with the center line of the runway.

14 Claims, 5 Drawing Sheets

LATERAL AXIS ROLLOUT CONTROL FOR AIRCRAFT

BACKGROUND OF THE INVENTION

1. Field of the Invention

This invention relates generally to aircraft guidance, and more particularly to a method and apparatus for providing automatic lateral guidance for an aircraft with respect to a directional radio beam during aircraft rollout upon landing.

2. Description of the Prior Art

A number of different types of systems have been heretofore developed for controlling the lateral guidance of an aircraft during rollout as it approaches a directional radio beam. Such systems typically operate in the terminal phase of an aircraft landing to align the flight path of the aircraft with the runway centerline by means combining localizer deviation signals with guidance parameters available from the aircraft's inertial guidance system and flight control computer. However, prior art systems have been subject to inducing unacceptable lateral deviations from the intended path once the aircraft is on the ground. Typical of the dynamic control complications introduced by the prior art is the decreased inherent stability of the aircraft as its ground velocity decreases due to the decreasing effectiveness of the control surfaces in controlling the aircraft path. Prior art guidance systems have suffered from overshoot, oscillation, or excessive lateral acceleration. The present invention relates to an improvement in rollout apparatus and methods by providing a system for generating steering control signals to continuously control subsequent lateral deviations from the intended flight path and to command the rudder and nosewheel to align the longitudinal axis of the aircraft with the runway centerline while minimizing oscillation and overshoot. The present ground rollout invention utilizes a runway command control law to command an optimal path for an aircraft to attempt to follow as it moves toward the center of the runway.

SUMMARY OF THE INVENTION

The foregoing disadvantages of the prior art are obviated by the present invention of apparatus and a method for controlling an aircraft that executes a smooth exponential transition curve to the center of the runway. The present apparatus comprises an aircraft rollout guidance system of the type including rudder controller means and nosewheel controller means for controlling the path of the aircraft along the surface of a runway; path command computation means for supplying a rollout predict command signal representative of a desired trajectory that will maintain the aircraft within predetermined lateral boundaries of the runway; means for generating a yaw rate signal, a lead compensated rudder command signal from the rollout predict command signal and an initial rudder command signal corresponding to a commanded rudder position prior to rollout engage; and means for combining the yaw rate signal, lead compensated rudder command signal, and the initial rudder command signal for positioning the rudder, thereby to control the position of the aircraft and urge the aircraft towards the center of the runway. In a preferred embodiment of the invention the rollout guidance system comprises means for generating a rollout predict command signal in accordance with a lateral path rate signal $Y_M$, a signal $Y_i$ representative of the initial lateral displacement of the aircraft from the center of the runway, and a signal $Y_i$ representative of the initial lateral displacement rate of the aircraft; further comprising runway position means for producing a signal representative of the lateral position of the aircraft with respect to a center line of the runway, and runway position rate means for producing a signal representative of the lateral displacement rate of the aircraft with respect to a center line of the runway. The apparatus further comprises path error computation means responsive to differences of the rollout predict command signal and the lateral displacement signal thereby producing an error signal representative of the positional difference. The preferred embodiment further comprises rate means for producing a signal corresponding to the rate of change of the rollout predict command signal; the path error computation means being responsive to the rate command signal and the lateral displacement rate signal for producing a resultant rate signal corresponding to a difference thereof and for combining the resultant rate signal with the error signal representative of a positional difference. A compensation network coupled in cascade with the path error computation means and rudder and nosewheel controller means is applied to introduce lead compensation to the combined signal produced by the path error computation means and thereby promote operational stability of the system and provide a lead compensated rudder command signal. A signal representative of the ground velocity of the aircraft is combined with the lead compensated rudder command to produce a resultant signal that increases with a decrease in ground velocity and decreases with an increase in ground velocity thereby augmenting the lead compensated rudder command signal at low values of ground velocity. The preferred embodiment includes means responsive to the position of the rudder for providing a rudder command signal representative of an initial position of the rudder prior to rollout engage, and means for providing a damping signal corresponding to body yaw rate of the aircraft, and further comprises summing means wherein the yaw rate signal, lead compensated rudder command signal and previous rudder command signal are combined and applied to control the rudder and nosewheel position. The combined signals assure a transient-free assumption of control by the control law command system during the rollout phase.

DESCRIPTION OF THE PREFERRED EMBODIMENT

Figure 1:
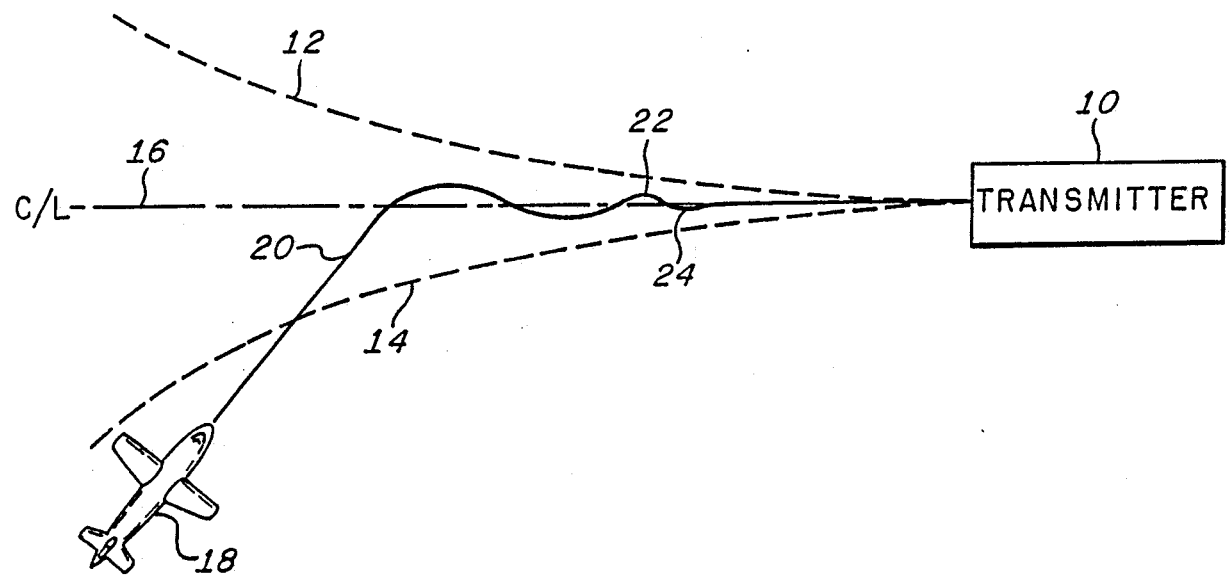
FIG. 1 is a graph illustrating the path followed by an aircraft utilizing localizer beam control apparatus.

Referring to FIG. 1, a transmitter 10, which may be a conventional omnirange or localizer transmitting station which operates in a well known manner, transmits a directional radio beam identified by the lines 12, 14. The center line of the directional radio beam, identified by the line 16, is aligned with the center line C/L of the runway. It is the object of the present invention to guide an aircraft identified generally by reference numeral 18 after touchdown on the runway so as to intercept the center line 16 on an optimal path over a predetermined course as the aircraft approaches the transmitter station 10. In the operation of the system, the aircraft 18 travels the path 20 over an initial transition segment 22 and then over an exponentially decaying segment 24 in a manner to be described.

Figure 2:
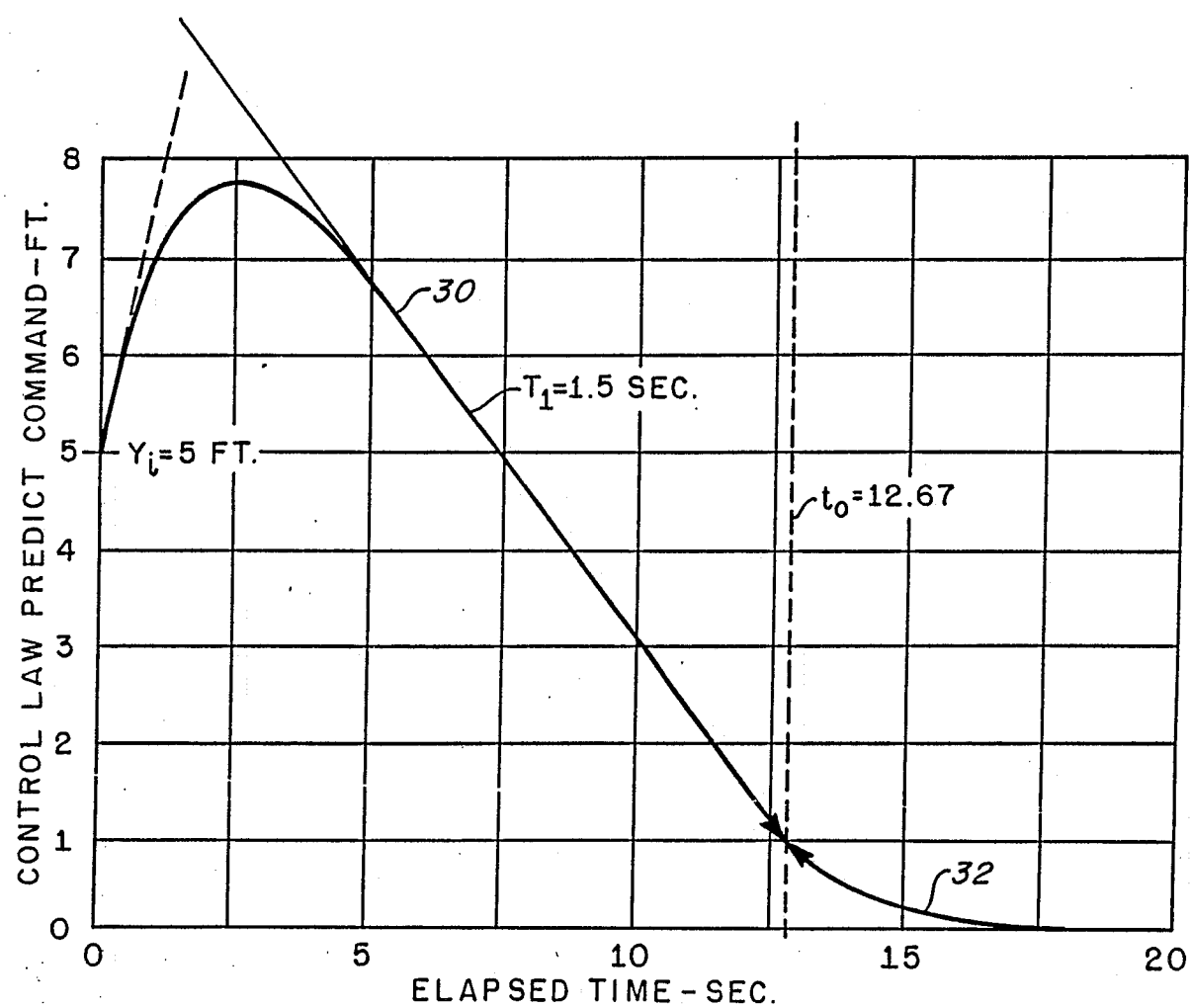
FIG. 2 is a graph illustrating the optimal path generated by the preferred embodiment of the present invention.

The present apparatus comprises means for generating a control law signal in accordance with a predict command path as shown in FIG. 2 and for providing a rudder and nosewheel command signal for controlling the aircraft to execute the desired command path for rollout. The predict command path of the control system may be easily modified to assume a path that, if followed precisely, would meet any government and/or commercial ground rollout requirement. By providing high circuit gains and stability compensation the control system urges the aircraft to follow this path with a high degree of precision.

FIG. 2 illustrates a rollout predict command path as generated by the control law of the present invention. In the preferred embodiment of the invention the control law signal generating means comprises means for generating a control law signal in accordance with a bifurcated predict command path:

$$Y_1 = T_i(Y_M + Y_i)(1 - e^{-t/T_1}) - Y_M t + Y_i \tag{1}$$

and $$Y_2 = Y_1 e^{-(t - t_o/T_i)} \tag{2}$$

where $Y_1$ is the segment of FIG. 2 labeled with reference numeral 30 and $Y_2$ is the segment of FIG. 2 labeled with reference numeral 32. Reference to is the time at which the curve transitions from segment 30 to segment 32; $T_1$ is a predetermined time constant characterizing the transient path of segments 30 and 32, which may be of the order of 1.5 sec; $Y_1$ is the localizer displacement or lateral distance of the aircraft 18 from the center line 16 over course segment 30 in feet; $Y_2$ is the localizer displacement from the center line 16 over course segment 32 in feet; $Y_i$ is the localizer displacement estimate at rollout engage in feet; $Y_i$ is the localizer displacement rate estimate at rollout engage in ft/sec; $Y_M$ is the maximum localizer displacement rate command towards the center of the runway, where $Y_M$ is the defined as 0.75 SIGN $(Y_i + Y_i T_1)$ and the operator "SIGN" denotes utilization of the algebraic sign of the indicated argument (i.e., the algebraic sum of the rate and displacement control signals), and may be of the order of 0.75 ft/sec; and t represents time elapsed in sec from rollout mode engage.

The concept in the development of the rollout predict curve 30, 32 is as follows: the total predict command curve is comprised of segment 30 and segment 32 as illustrated. Curve 30 ends and curve 32 begins at a time $t_o$ calculated in a manner to be described. Segment 30 is initially equal to the lateral displacement of the aircraft from the runway, $Y_i$. The derivative of segment 30 is initially equal to runway displacement rate $Y_i$ at the moment of rollout mode engagement. This results in an initial error term of zero. A requirement for this function is that it equals zero at $Y_i$ in order to realize a smooth transition from the prerollout mode to the curved rollout path. A predetermined time constant $T_1$ and predetermined maximum displacement rate $Y_M$ based on the aircraft characteristics and passenger comfort is then assigned to segment 30. The derivative of segment 30 is then defined to start at $Y_i$ and lag to $Y_M$ at the predetermined time constant $T_1$.

The differential equation of the desired lateral motion of the aircraft over segment 30 is $$Y_i = Ae^{-t/T_1} \tag{3}$$

where $Y_1$ is the craft's lateral acceleration and A is an unknown constant whose value is to be determined. Integrating equation (3) to obtain a differential equation representative of the lateral rate of displacement of the aircraft yields:

$$Y_1 = \int Ae^{-t/T_1} dt = -Ae^{-t/T_1} + C \tag{4}$$

Since A is an arbitrary constant, equation (4) may also be expressed as:

$$Y_i = Ae^{-t/T_1} + C \tag{5}$$

where A and C are unknown constants to be determined. From the initial conditions which have been established, at t=0

$$Y_1 = Y_i \tag{6}$$

Therefore, substituting equation (6) in equation (5)

$$Y_i = A + C \tag{7}$$

Further, substituting the value $t = \infty$ in equation (5), assuming segment 30 extends in a straight line path defining the values of $Y_M$ by its slope, $$Y_1 = -Y_{M\ tm} \tag{8}$$

and $$-Y_M = C \tag{9}$$

Substituting equation (9) in equation (7) and solving for A $$A = Y_i + Y_M \tag{10}$$

Substituting equations (9) and (10) in equation (5) results in $$Y_1 = (Y_i + Y_M)e^{-t/T_1} - Y_M \tag{11}$$

Integrating equation (11) provides the lateral displacement of the aircraft over segment 30:

$$Y_1 = \int Y_1 dt = T_1(-Y_M - Y_i)e^{-t/T_1} - Y_M t + D \tag{12}$$

where D is an unknown constant.

From the initial conditions for lateral displacement, at $t=0$, $Y_1=Y_i$. Hence, from equation (12) and solving for D at $t=0$ $$D = Y_i + T_1(Y_M + \dot{Y}_i) \tag{13}$$

Substituting equation (13) in (12) yields the desired differential equation describing the lateral displacement of the aircraft as it traverses segment 30 of the predict command path:

$$Y_1 T_1(-Y_m - \dot{Y}_i)(e^{-t/T_1} - 1) - Y_m t + Y_i \tag{14}$$

Referring again to FIG. 2, segment 32 is an exponential lag to zero displacement at time constant $T_1$ where the initial condition is equal to the value of segment 30 at $t=t_o$. As is well known to those skilled in the art, this may be expressed as $$Y_2 = Ee^{-\left(\frac{t-t_o}{T_1}\right)}. \tag{15}$$

E is a constant representative of the magnitude of lateral displacement and $t_o$ is a constant corresponding to the time duration at which segment 30 transitions to segment 32. To calculate E and $t_o$, equation (15) is equated to equation (14), since the segments have an equal value at $t_o$, and equation (13), the derivative of segment 30, representative of the lateral rate of segment 30, is set equal to the derivative of equation (20), the lateral rate over segment 32 at time duration $t=t_o$. From the simultaneous solution of the two sets of equations, two unknowns, time $t_o$ and magnitude E, may be determined. From equations (14), (15), $$Y_1 = Y_2 = T_1(-Y_M - \dot{Y}_i)(e^{-t/T_1} - 1) - Y_M t + Y_i = Ee^{-(t-t_o/t_1)} \tag{16}$$

Differentiating equation (16) and equating to equation (11) yields $$(\dot{Y}_i + Y_M)e^{-t/T_1} - Y_M = -E/T_1 e^{-(t-t_o/t_1)} \tag{17}$$

Equation (17) may be rewritten in the form $$T_1(\dot{Y}_i + Y_M)e^{-t/T_1} - T_1 Y_M = -Ee^{-(t-t_o/T_1)} \tag{18}$$

Summing equations (16) and (18) yields $$T_1(Y_M + \dot{Y}_i) = Y_M t + Y_i - T_1 Y_M = 0 \tag{19}$$

Simplifying and solving for t $$T_1 \dot{Y}_i - Y_M t + Y_i = 0 \tag{20}$$

$$t = \frac{Y_i + T_1 \dot{Y}_i}{Y_M} \tag{21}$$

It is known that when $t=t_o$, E=value of curve $Y_1$. Thus $$t_0 = \frac{Y_i + T_1 \dot{Y}_i}{Y_M} \tag{22}$$

and E is set to an initial condition equal to $Y_1$ at time $t_o$. Note that t is always a positive value, so the control law must change the sign $Y_M$ if to is calculated to be a negative number.

It will be appreciated by one skilled in the art from the foregoing discussion that the differential equations (14) and (15) and the solution thereof, equation (22) represent a family of exponential curves parameterized in accordance with the time constant $T_1$, the initial values $Y_i$ and $\dot{Y}_i$, and the maximum value $Y_M$.

Referring now to FIG. 3, a schematic block diagram of apparatus for controlling an aircraft to execute an exponential command path of the type depicted in FIG. 2 is illustrated. The apparatus of FIG. 3 generates a predict command path in accordance with the transition curves of FIG. 2. It is appreciated that the apparatus of FIG. 3 may be implemented by discrete analog or digital circuitry or by a programmed general purpose digital computation apparatus. It will be further appreciated that mathematical terms equivalent to those delineated above may be utilized in implementing embodiments of the present invention.

Figure 3A:
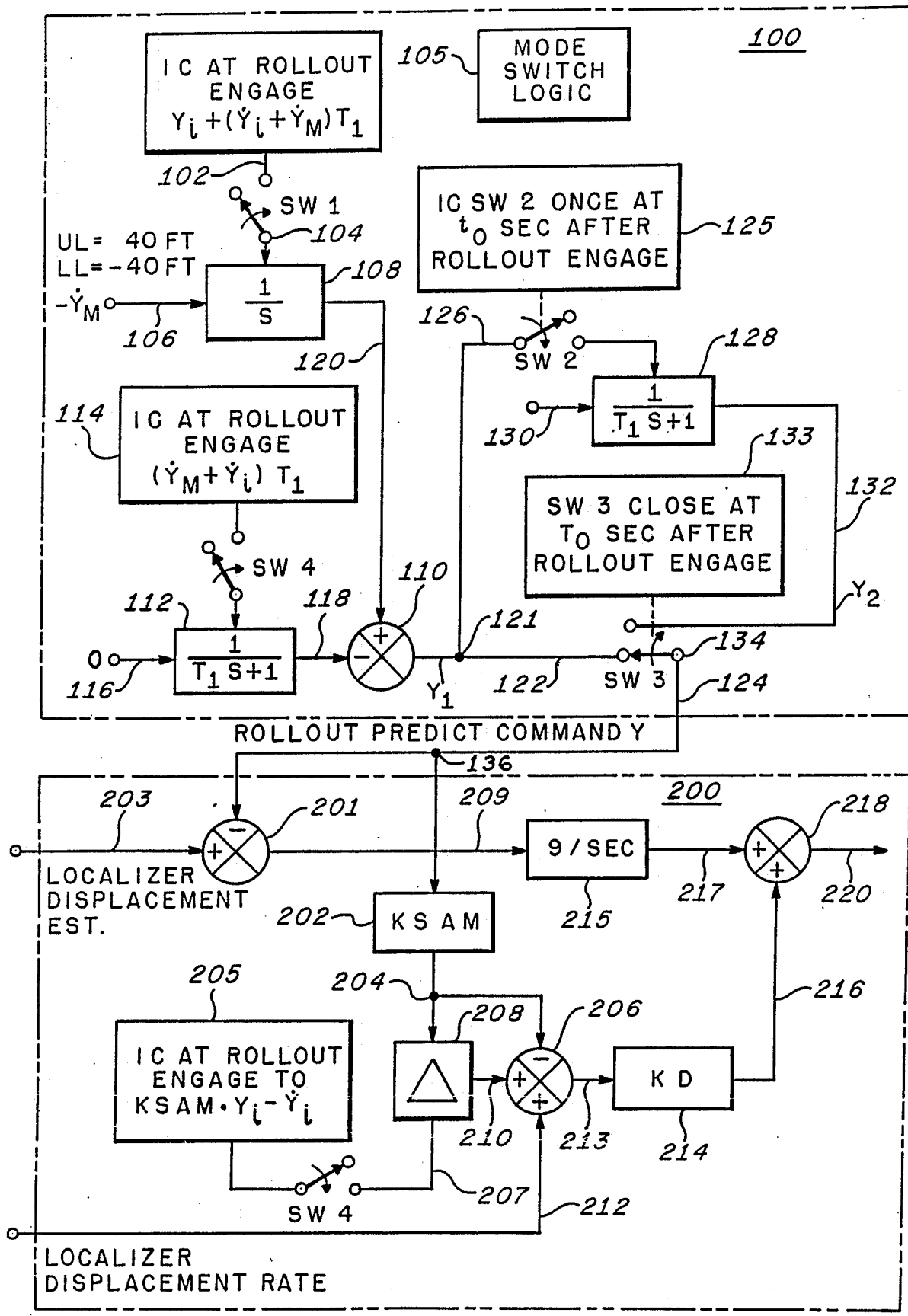
FIG. 3A and FIG. 3B are schematic block diagrams of the control law apparatus of the present invention.
Figure 3B:
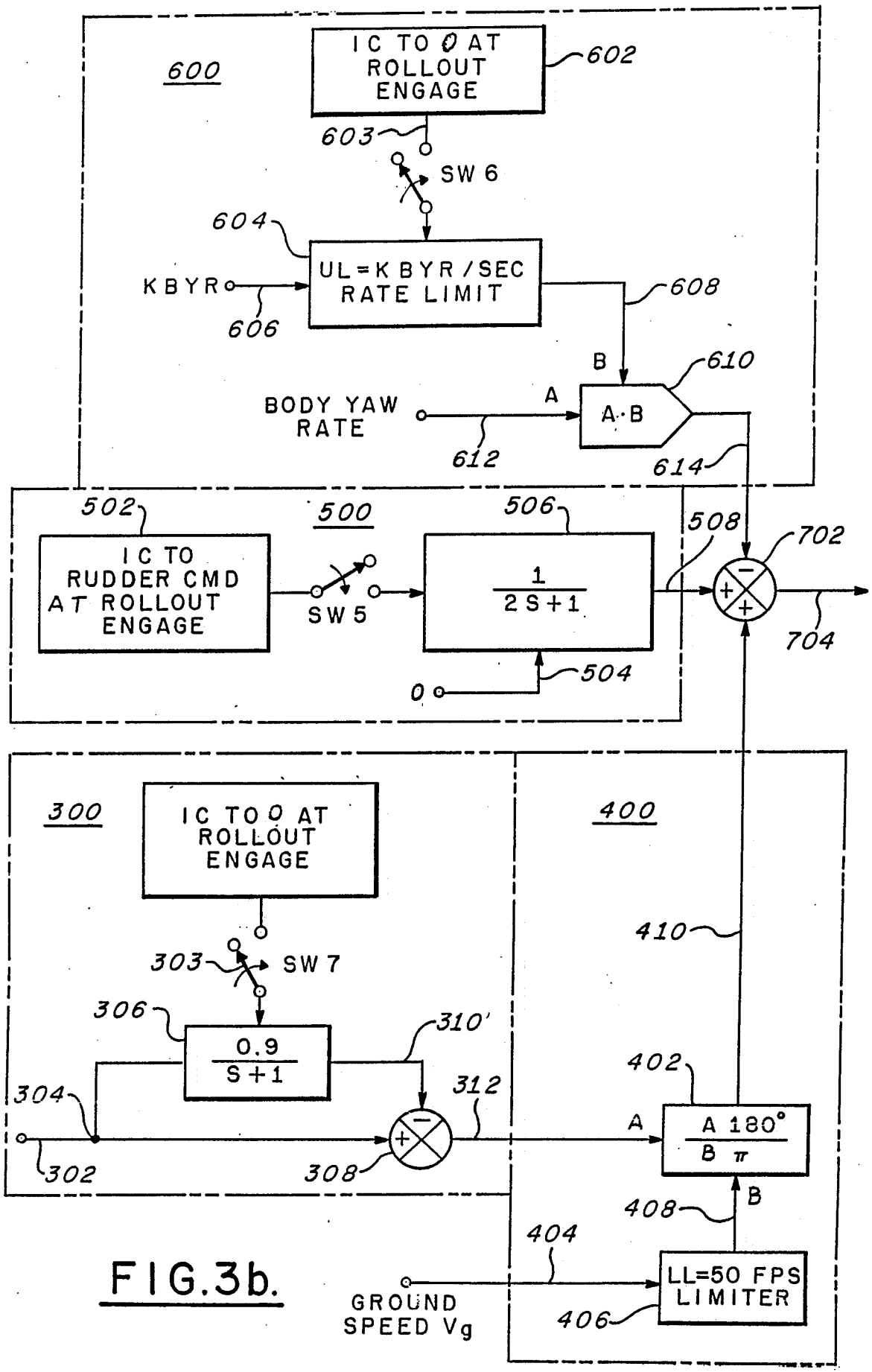

FIG. 3 is comprised of figures FIG. 3A and FIG. 3B which are operatively connected through leads 220 and 302. FIG. 3A is comprised of circuits 100 and 200, whose function will be described.

Referring now to block 100 of FIG. 3A, there is shown a schematic diagram of the present predict command path signal generator which includes information developed from a flight control computer (not shown) and a mode switch logic 105. Mode switch logic 105 acts to energize signal paths denoted as SW1, SW2, etc., in accordance with a programmed time sequence as will be described. Mode switch logic 105 may be comprised of analog switches or digital timing circuits. In the command path generator of circuit 100 an initial condition signal denoted as IC is developed by the flight control computer and applied to lead 102 to generate the value $Y_i + T_1(\dot{Y}_i + Y_M)$ from signals generated by conventional rate sensors such as a rate gyroscope, and a conventional localizer receiver (not shown), and predetermined values of $Y_M$ and $T_1$. The signal on lead 102 is applied through switch SW1 by the closure of the circuit through switch arm 104 when activated by mode switch logic 105 on initiation of the rollout engage mode. The rollout engage mode may be activated by the pilot or by automatic means. A signal $-Y_M$, representative of the maximum allowable lateral displacement rate, also developed by the flight control computer, is applied on lead 106 to a combined integrator-limiter circuit means 108, denoted by the LaPlacian symbol 1/S and coupled to a mixing device 110. Integrator-limiter 108 is designed to accommodate signals having an upper limit of 40 feet lateral displacement and a lower limit of −40 feet displacement. A lag circuit 112, denoted by the operator $1/(T_1 S + 1)$ at block 112 is energized at engagement of the rollout mode by an IC signal 114 having an initial value of $T_1(Y_M + \dot{Y}_i)$ through mode switch SW4, which is operated by mode switch logic 105 on rollout mode engage. A signal having a null value is applied on lead 116 also to lag circuit 112. After initial engagement, the signal derived from lag 112 will lag to a zero value, appearing on lead 118. Upon rollout engage mode being initiated under the control of mode switch logic 105, switch SW4 places signal 114 across the lag circuit 112 such that the initial value applied thereto appears in a subtractive sense on lead 118 at mixing device 110 and the signal on lead 118 thereafter bleeds off to zero. The output signal on lead 118 has a value $-T_1(\dot{Y}_i + Y_M)e^{-t/T_1}$. In a like manner on rollout engage, switch SW1, activated by mode switch logic 105, applies the initial condition signal IC on lead 102 to integrator-limiter circuit 108, whereby integrator-limiter 108 produces an output signal on lead 120 in an additive sense having a value of $Y_M t + Y_i + T_1(Y_i + Y_M)$.

The signal $Y_1$ from the output of mixing device 110 is applied to a node 121 and coupled to leads 122 and 126. The signal $Y_1$ on lead 122, representative of the algebraic sum of the signals on leads 118 and 120, is coupled by a switch SW3 to rollout predict command lead 134 when activated by mode switch logic 105 at rollout engage. The signal $Y_1$ on lead 126 is applied to a lag circuit 128 whose operation is identical to that described above with respect to lag circuit 112. Switch SW2 is activated by mode switch logic 105 at $t_o$ seconds after rollout engage as denoted by block 125. This is the condition wherein the initial value of signal $Y_2$ matches the lag value of signal $Y_1$. Lag circuit 128 also receives a signal having a null value on lead 130. Thus, during the initial phase of rollout engage, signal $Y_1$ is coupled through lead 122 to switch SW3, switch arm 134, and lead 124 to comprise the rollout predict command Y. At $t_o$ seconds after rollout engage, mode switch logic 105 causes switch SW3 to transfer switch arm 134 to lead 132. Signal $Y_1$ on lead 126 is applied by switch SW2 to lag circuit 128 and thereafter exponentially decays to a null value, which signal is applied via lead 132 and switch arm 134 of switch SW3, also controlled by mode logic switch 105, to lead 124. The signal $Y_2$ comprises the second portion of the curve shown in FIG. 2 as segment 32.

The rollout predict command signal Y is further processed in block 200 as will be described. The output signal Y on lead 124 is applied to a node 136 and then to sampling circuit 202 which has a gain KSAM. Sampling circuit 202 periodically samples the magnitude or the rollout predict command and applies the sample output to a node 204. A suitable sampling rate for KSAM is 20 samples/sec. The sample signal is coupled from node 204 to a mixing device 206 in a subtractive sense and to a storage device 208, the output of which is coupled on lead 210 to the mixing device 206 in an additive sense. As sampling device 202 provides a new signal for each sample period to mixing device 206, it is compared with the previous value stored in storage device 208 to develop a difference signal thereof, whereupon storage device 208 is updated to the last applied signal value. The difference signal, being sampled in a predetermined increment of time, which is small in relation to the rate at which the signal Y is changing, effectively provides the rate of change of the rollout predict command in accordance with the well known differential operator dy/dt=rate. Also applied to mixing device 206 is a signal on lead 212 derived from the localizer estimator of the flight control computer, which is representative of the displacement rate of the aircraft from the center line of the runway. The rate signal 212 is combined with the derived rollout predict command rate signal as described above to yield a signal 213 corresponding to the rate error between the command signal 136 and displacement signal 212. Storage device 208 is initialized at rollout engage by a signal 205 through switch SW4, operated by mode switch logic 105, and provides a signal on lead 207 having a value $KSAM \cdot Y_i - Y_i$.

The initialization of storage device 208 by the IC signal 205 on lead 207 sets lead 213 to a zero value and precludes an abrupt change in output from mixing device 206 upon engagement of the rollout mode, which change would lead to a transient deflection of the rudder of the aircraft.

The output of mixing device 206 is applied on lead 213 to a gain 214. The output of gain 214 appears on lead 216 and is applied to a mixing device 218. A localizer displacement estimate signal derived from the flight control computer is applied on lead 203 to mixing device 201 in an additive sense. This signal is combined with the rollout predict command Y from node 136 which is applied in a subtractive sense to provide an error signal corresponding to the estimated lateral displacement of the aircraft from the desired position. The error signal, in units of feet, appears on lead 209 where it is converted to a rate signal by gain 215 having a gain factor of 9/sec. The gain scaled rate signal is applied on lead 217 in an additive sense in mixing deice 218 and combined with the signal on lead 216. Thus, a signal proportional to the sum of the lateral deviation of the aircraft from the desired path and the rate of lateral displacement appears on lead 220.

Referring now to FIG. 3b, the signal on lead 220 is coupled via lead 302 to node 304 in circuit 300. The elements of circuit 300 constitute a lead compensation circuit which acts to stabilize the inherent oscillitory nature of the system. Combinations of lead and lag networks are used frequently in automatic control systems to modify the stability or response characteristics in some desirable manner. In such applications they are also referred to as compensation networks. The compensation network is comprised of a lag circuit 306 having a gain factor $(0.9/S + 1)$, a mixing device 308, and a switch SW7.

Circuit 300 effectively provides an error signal that is proportional to both the magnitude and the rate of change of the applied signal. Thus the full magnitude of the error voltage appearing at node 304 is coupled to the mixing device 308 in a positive sense and appears at lead 312. At rollout engage switch arm 303 of switch SW7 couples an initial signal having a null value to lag circuit 306. Following rollout engage lag network 306 integrates the signal appearing at node 304 and provides an increasing signal on lead 310 which is applied in a subtractive sense to mixing device 308. This results in diminishing the signal on lead 312 with time. The signal on lead 312 is applied to one input of a divider 402 in circuit 400.

Circuit 400 is applied to gain scale the rudder command signal in accordance with the ground speed $V_g$ and to convert the command signal 312, which is in units of ft-deg/sec, to units of degrees of rudder deflection. Element 402 comprises a gain-scaled divider which receives a numerator A on lead 312 from combining device 308 and a devisor signal B on lead 408 from rate limiter 406. Limiter 406 receives a signal representative of ground speed, which may be produced, for example, by an inertial reference system, on lead 404. Limiter 406 is designed to provide a minimum lower limit of 50 ft/sec to divider 402, so that a condition of division by zero is never achieved. The effect of applying the ground speed signal is to increase the rudder command signal at low velocities where the rudder deflection and nose wheel position are less effective in controlling the position of the aircraft. The output of divider 402 appears on lead 410 and is applied to a combiner 702, and is further combined with signals from circuit 500 in an additive sense and signals from circuit 600 in a subtractive sense, as will be described.

Circuit 500 provides a rudder command IC signal to avoid an abrupt rudder command transient at rollout engage. At rollout engage circuit 502 provides an IC signal corresponding to the immediate past commanded position of the rudder prior to rollout engage, through switch SW5, which is engaged by mode logic switch 105. This signal initializes lag circuit 506 to provide a corresponding output on lead 508 which adds to the signal from lead 410 in mixing device 702, thus assuring that there is no abrupt command issued to change rudder position at rollout engage. A steady state signal having a null value is applied on lead 504 to lag circuit 506. Thus, the output signal from lag circuit 506 is lagged to a null value, allowing the signal on lead 410 to have full effect after a predetermined time duration.

Circuit 600 is used to provide body yaw damping, since without it, the pilot will have serious difficulties in controlling the airplane. The yaw damping signal on lead 614 constitutes a third input and is applied in a subtractive sense to combining device 702. The output of combining device 702 on lead 704 is applied to the aircraft rudder servo to position the aircraft rudder and control the aircraft in yaw. At rollout engage circuit 602 applies a null value signal to lead 603. Switch SW6 is actuated by switch mode logic 105 and applies the signal on lead 603 to rate limit 604. Rate limit 604 receives a signal on lead 606 corresponding to a predetermined maximum body yaw rate and has an upper rate limit of KBYR/sec. Thus, at rollout engage a null value signal is applied on lead 608 to a multiplier 610; this signal is then integrated in circuit 604 until the maximum value of KBYR/sec is reached. The body yaw rate signal on lead 612 is multiplied by the rate limited signal on 608 and the product thereof appears on lead 614.

Figure 4:
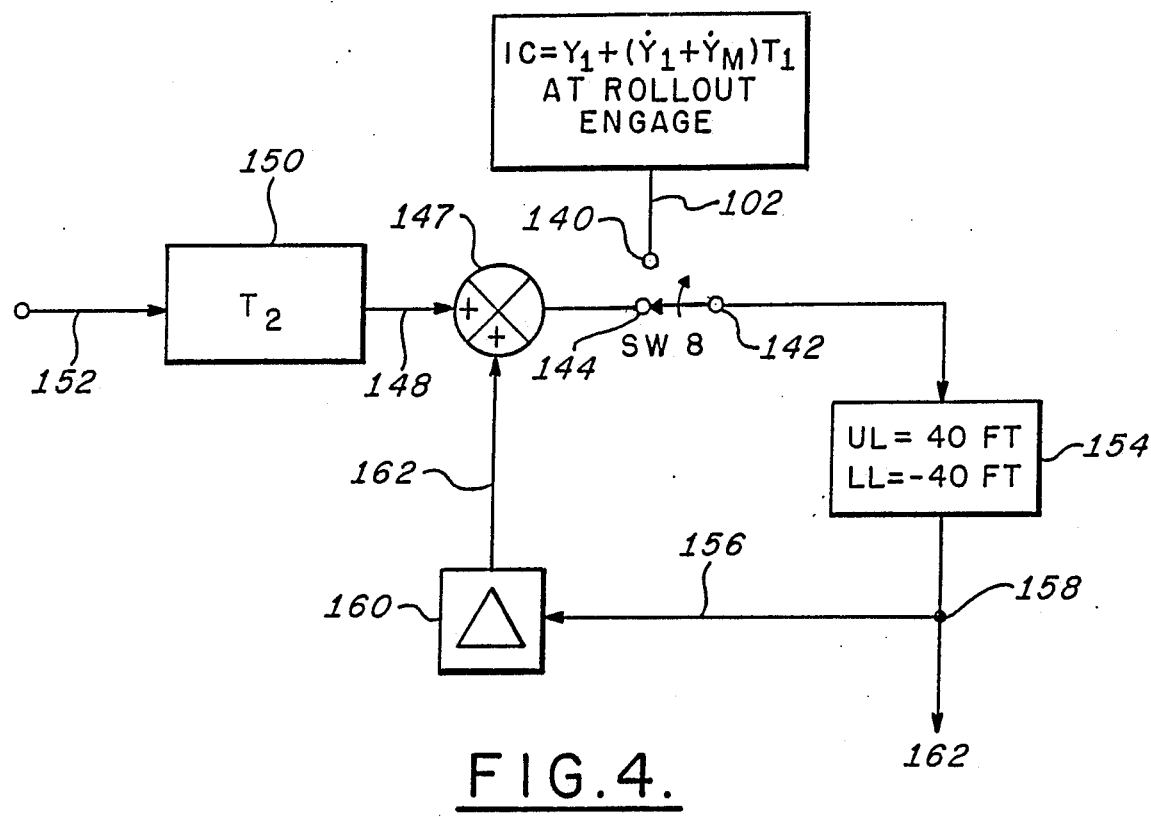
FIG. 4 is an alternate embodiment of an integrator circuit depicted in FIG. 3A, useful in a computer embodiment of the invention.

FIG. 4 shows an alternate embodiment of the integrator circuit 108 of FIG. 3A. The input signal $-Y_M$ is applied on lead 152 to a gain 150 having a gain value of $T_2$, where $T_2$ is a sample period. The gain scaled signal appearing on lead 148 is applied in an additive sense to a combining device 147 whose output is applied to terminal 144 of switch SW8. At rollout engage switch SW8 is switched to terminal 140 which receives an IC signal on lead 102 which is identical to that described with respect to FIG. 3A. The IC signal is applied through switch SW8 terminal 142 to a gain limiter 154 having an upper limit of 40ft and a lower limit of $-40$ ft. The output of circuit 154 is coupled to a node 158 for providing a signal at rollout engage to lead 162 where it is coupled to mixing device 110 (not shown). Node 158 is further coupled via lead 156 to sample and hold circuit 160 whose output is coupled on lead 162 to mixing device 147 where it is combined with the signal on lead 148. After rollout engage the switch arm of switch SW8 couples terminal 144 to terminal 142 so that the signal at mixing device 147 is continually incremented in accordance with the sample period. The circuit therefor functions as an integrator.

Figure 5:
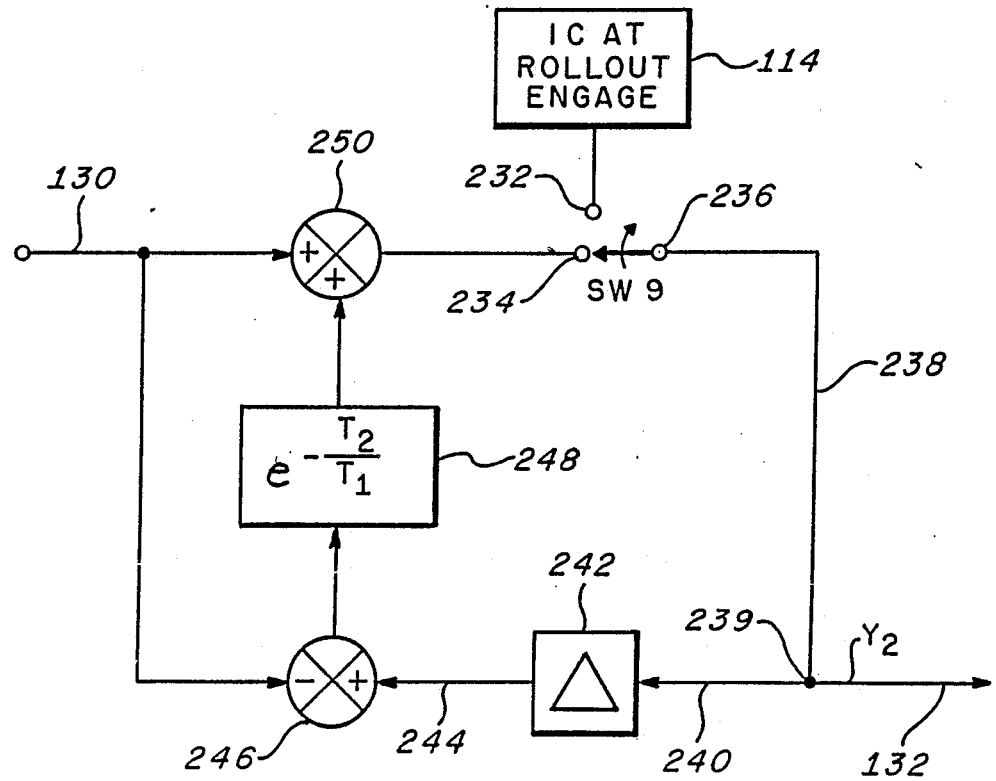
FIG. 5 is an alternate embodiment of a lag circuit of FIG. 3A, useful in a computer-generated embodiment of the present invention.

Referring to FIG. 5, there is shown an alternate embodiment of the lag circuit 128 of FIG. 3A. At rollout engage, circuit 114 provides an initial signal IC to terminal 232 of switch SW9. Terminal 236 of switch SW9 is engaged by mode logic switch 105 with terminal 232 at rollout engage. The resulting signal is coupled over lead 238 to node 239 and outputted on lead 132 which couples to switch SW3 (not shown) to provide a $Y_2$ signal. Following the initialization at rollout engage, mode switch logic 105 transfers the switch arm of switch SW9 to terminal 234. The signal at node 239 is coupled on lead 240 to sample and hold circuit 242 and applied through lead 244 and combiner 246 to an exponential decay circuit 248 having a gain factor which lags in accordance with the sample frequency $T_2$ and a predetermined time constant $T_1$. The input signal on lead 130 is applied in a subtractive sense to combiner 246, where it is algebraically summed with the signal on lead 244. The output of decay circuit 248 is coupled via a further combiner 250 and summed with the input signal on lead 130 to contact 234 of switch SW9 and lead 238 to node 239 and appears at lead 132. Since gain 248 is continually diminishing the signal applied thereto, and storage and hold circuit 242 is continually updated with a reduced signal level, there results an output which lags to zero in accordance with control law segment $Y_2$.

It should be noted that FIG. 4 provides a substantially rectangular integration waveform, which is particularly adapted for use with digital applications. Similarly, the lag circuit of FIG. 5 is also well suited for digital application. If the invention is embodied in a digital apparatus, the circuits of FIG. 4 and FIG. 5 are preferred, as they do not result in the generation of undesired transient components which can occur with less idealized simulations, such as trapezoidal integration.

Figure 6:
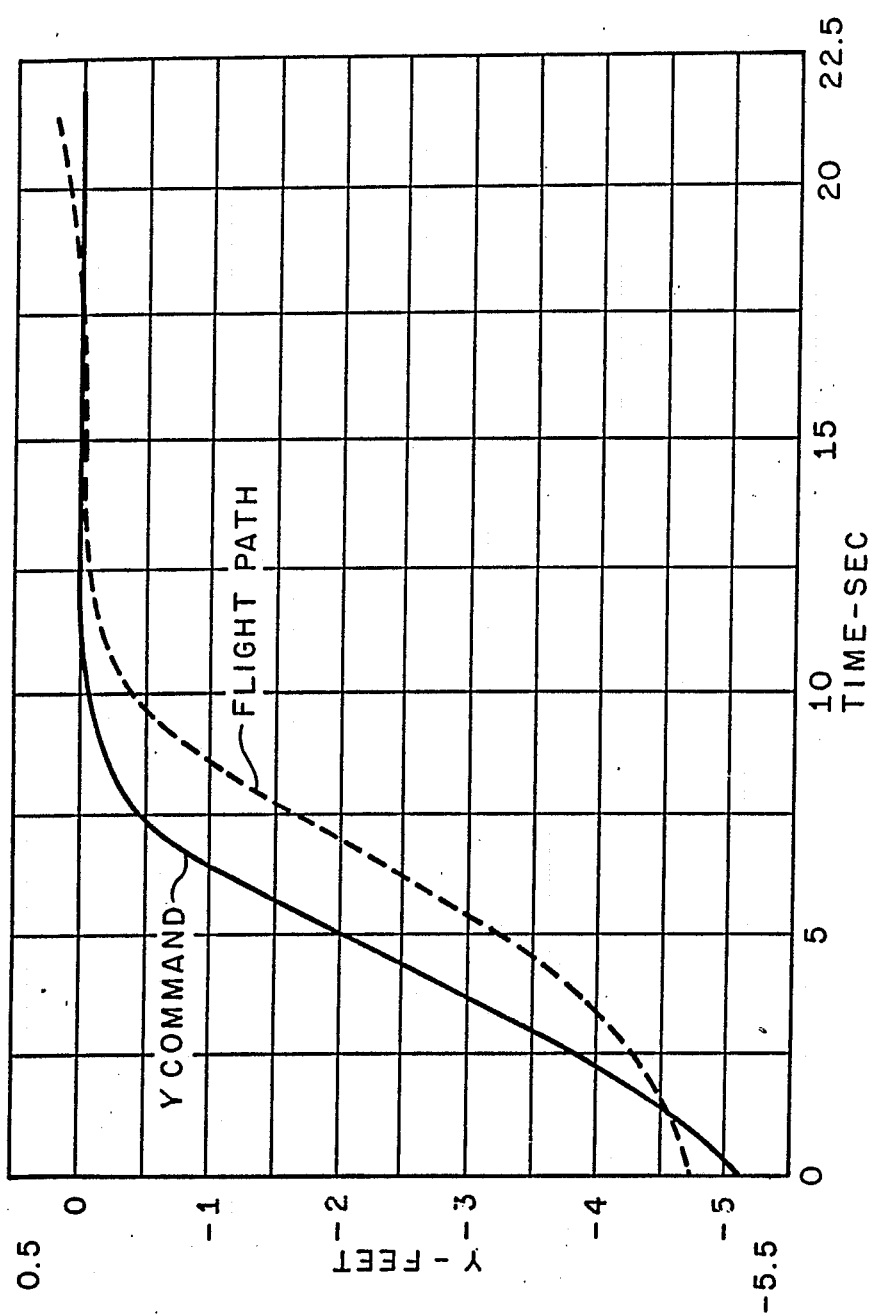
FIG. 6 is a graph illustrating the desired exponential path and an actual path followed as obtained in a computer simulation of the aircraft.

In operation, referring again to FIG. 2, there is shown the generation of a control law predict command where the initial displacement of the aircraft $Y_i$ has a value of 5 ft, the initial displacement rate $Y_i$ has a value of 3 ft/sec, the time constant $T_1$ has a value of 1.5 sec, the maximum displacement rate $Y_M$ has a value of 0.75 ft/sec, and the computed elapsed time from rollout engage at which segment 30 transitions to segment 32 has a value $t_o = 12.67$. Note that segments 30 and 32 meet asymptotically in this example at a common value of 1 ft. FIG. 6 shows a computer generated simulation for one control law predict command path denoted as Y COMMAND and a resultant flight path for a simulated aircraft. It may be seen that rollout was engaged at about $-5$ ft lateral displacement and that the aircraft was substantially aligned with the center line of the runway (zero displacement) at 17.5 sec. It is noted that the flight path commanded is followed with minor deviations without oscillation and with a negligible overshoot.

It will now be seen from the foregoing description of the invention that means have been provided for guiding an aircraft along a multi-segment path during the rollout phase of a landing. A feature of the invention is that each of the segments is captured in an asymptotic manner. Two independently generated control law signals are used to generate a rollout command path predict signal. Asymptotic segment captures are assured in the presence of varying ground speed conditions due to the unique sequence of application of the signals.

While the invention has been described in its preferred embodiment, it is to be understood that the words which have been used are words of description rather than limitation and that changes may be made within the purview of the appended claims without departing from the true scope and spirit of the invention in its broader aspects.

Embodiments of an invention in which an exclusive property or right is claimed are defined as follows:

1. An aircraft rollout guidance system of the type including rudder and nosewheel controller means for controlling the path of the aircraft along the surface of a runway, comprising:

course command computation means for supplying a rollout predict command signal representative of a desired path that will maintain said aircraft within predetermined lateral boundaries of said runway, wherein said command computation means includes means for processing in a predetermined manner a lateral path rate signal $Y_M$, a signal $Y_i$ representative of the initial lateral displacement of the aircraft from the center of the runway, and a signal $Y_i$ representative of the initial lateral displacement rate of the aircraft, runway position means for producing a signal representative of the lateral position of the aircraft with respect to a center line of the runway, runway position rate means for producing a signal representative of the lateral displacement rate of the aircraft, path error computation means responsive to a difference of said rollout predict command signal and said lateral displacement signal for producing an error signal representative of a positional difference, rollout predict rate command means for producing a signal corresponding to the rate of change of said command signal, said path error computation means further responsive to said rate command signal and said lateral displacement rate signal for producing a resultant rate signal corresponding to an algebraic difference thereof, and for combining said resultant rate signal with said error signal representative of a positional difference, compensation network means, coupled in cascade with said path error computation means and said rudder and nosewheel controller means, for introducing lead compensation to said combined signal produced by said path error computation means, thereby to promote operational stability of said system and provide a lead-compensated rudder command signal, ground speed means for providing a signal representative of ground velocity of said aircraft, means for combining said lead compensated rudder command signal and said signal representative of ground velocity so that the resultant signal thereof increases with a decrease in ground velocity and decreases with an increase in ground velocity, thereby to augment said lead compensated rudder command signal at low values of round velocity, means responsive to a commanded position of the rudder prior to rollout engage for providing a rudder command signal representative of an initial commanded rudder position, means for providing a yaw damping signal representative of a body yaw rate of the aircraft, and combining means for providing an algebraic sum of said augmented lead-compensated rudder command signal and said rudder command signal and for subtracting said yaw rate signal, thereby to provide a further signal for positioning said rudder and said nosewheel to control the position of the aircraft and urge said aircraft towards the center of the runway.

2. The system as set forth in claim 1, wherein said course command computation means comprises means for computing a first segment of said desired path according to the relationship:

$$Y_1 T_1(-Y_M - Y_i)(e^{-t/t1} - 1) - Y_M t + Y_i$$

and for computing a second segment of said desired path according to the relationship:

$$Y_2 Y_1 e^{-(t-t_o/T1)}$$

where $T_1$ is a predetermined time constant and $t_o$ is defined in accordance with the relationship:

$$t_o = (Y_1 + Y_i T_1)/Y_M$$

where $t_o$ is the time elapsed following engagement of the rollout mode at which the aircraft is directed from said first segment of said desired path to said second segment of said desired path.

3. The system as set forth in claim 2, wherein said means for computing said first segment of said desired path comprises:

integrator means, responsive to said signal $Y_M$ for providing an integrated output signal, said integrator means also comprising limiter means for limiting operation of said integrator means between predetermined upper and lower values corresponding to lateral displacement of the aircraft from the center of the runway, and further responsive to a first signal at engagement of the rollout mode in accordance with the relationship:

$$Y = Y_i + (Y_i + Y_M)T_1;$$

first lag circuit means, responsive to a second signal at engagement of the rollout mode in accordance with the relationship:

$$Y = (Y_i + Y_M)T_1$$

and further responsive to a null value input signal so that said second signal is exponentially lagged to a null value, first combining means for algebraically combining said integrated output signal and said lagged signal in a subtractive sense, and mode switch logic control means for applying said first and second signals in accordance with initiation of said rollout engagement mode and for selectively providing signals $Y_1$ and $Y_2$ corresponding to said first or second path in accordance with said time duration to to said path error computation means.

4. The system as set forth in claim 3, wherein said means for computing said second segment of said path comprises:

second lag circuit means responsive to a null value input signal and further responsive to said signal $Y_1$ when activated by said mode switch logic control at rollout engage, for producing said signal $Y_2$, so that the value of said signal $Y_2$ is exponentially urged to a null value corresponding to the center of the runway.

5. The system as set forth in claim 4, wherein said path error computation means further comprises:

second combining means for algebraically combining said rollout predict command signal and said lateral position signal in a subtractive sense, first gain means coupled to receive said algebraically combined signal from said second combining means and to apply a predetermined gain factor for algebraically converting said lateral position signal to a rate signal proportional thereto, rate means responsive to samples of said rollout predict command signal as a function of time for providing a differentiated rollout predict command signal, third combining means for algebraically summing said differentiated rate signal and said lateral displacement rate signal for producing said resultant rate signal, second gain means for applying a predetermined gain factor to said resultant rate signal, and fourth combining mean responsive to said first gain means and said second gain means for algebraically combining gain scaled signals therefrom in an additive manner and applying said combined signals to said compensation network means.

6. The system as set forth in claim 5, said compensating network means comprising:

an input for receiving said combined signals from said fourth combining means, fifth combining means for providing an output signal to said means for combining said lead compensated rudder command signal and said signal representative of ground velocity, means for coupling said input to said fifth combining means, and third lag circuit means coupled between said input means and said fifth combining means, for phase shifting at least a portion of said combined signals applied thereto.

7. The system as set forth in claim 6, said means for providing a damping signal representative of body yaw rate further comprising gain scaling means responsive to a predetermined body yaw rate signal and to said mode switch logic control means for varying said damping signal from a null value at rollout engage to a value proportional to said predetermined body yaw rate.

8. The system as set forth in claim 7, said means responsive to rudder position comprising fourth lag circuit means responsive to a past value of rudder angular displacement when enabled by said mode switch logic control means at rollout engage and also responsive to a null value signal for lagging said past value to null valve in accordance with a predetermined time constant of said lag circuit means.

9. The system as set forth in claim 8, wherein said integrator means comprises a trapezoidal integrator of the form K/S.

10. The system as set forth in claim 9, wherein said integrator means comprises a rectangular integrator.

11. The system as set forth in claim 10, said rectangular integrator comprising gain means for providing an input signal inversely gain scaled proportional to a predetermined sample, limit means responsive to said gain scaled signal and having predetermined upper and lower bounds for providing an output signal, storage means responsive to a past value of said output signal, and combining means for algebraically summing said past value signal with a present value of said input signal, whereby said output signal is cumulatively increased in an integral fashion.

12. The system as set forth in claim 11, said first or second lag circuit means comprising:

input means for receiving an input signal, storage means for storing an applied signal and responsive to said input signal or an initial signal at a predetermined time interval, further combiner means responsive to said input signal and said storage means for providing an algebraic difference thereof, exponential gain scaling means having a predetermined time constant and responsive to said algebraic difference, and means for combining said input signal and an output of said gain scaling means in an additive manner, so that said initial signal is exponentially lagged to the value of said applied input signal in accordance with said predetermined time constant.

13. Apparatus for controlling an aircraft to traverse a multi-segment rollout path, comprising:

control law means for providing a signal corresponding to the lateral displacement of the aircraft along the surface of a runway and relative to a path segment to be captured, means responsive to said control law means for providing a signal corresponding to a lateral displacement rate of the aircraft relative to said path segment to be captured, means for providing a signal corresponding to the round speed of the aircraft, means for combining said lateral displacement signal, said lateral displacement rate signal, and said ground speed signal, aircraft control means for controlling the lateral displacement of the aircraft, and switching means coupled to said control law means, said displacement rate signal means and said aircraft control means, for applying a signal corresponding to a first segment to be captured to said control means for a first predetermined time duration, and for applying a signal corresponding to a second segment to be captured to said control means for a second predetermined time duration at a predetermined transition time, said first and second segments being asymptotically coincident at said first predetermined time duration, and said combined signal having a null value at said second predetermined time duration.

14. A method for controlling an aircraft to fly a multi-segment rollout path, comprising:

producing a signal corresponding to the lateral displacement of the aircraft along the surface of a runway and relative to a path segment to be captured, producing a signal corresponding to a lateral displacement rate of the aircraft relative to said segment to be captured, producing a signal corresponding to the ground speed of the aircraft, combining the lateral displacement signal, lateral displacement rate signal, and ground speed signal, providing aircraft control means for controlling the lateral displacement of the aircraft in response to said combined signal, applying a function of an initial signal corresponding to the initial position of the aircraft at rollout engage to generate said lateral displacement signal, said displacement rate signal, and said combined signal, applying a signal corresponding to a first segment to be captured to said control means for a first predetermined time duration, applying a signal corresponding to a second segment to be captured to said control means for a second predetermined time duration at a predetermined transition time, and synchronizing the generation of said first and second path segments to be asymptotically coincident at said first predetermined time duration, and driving said combined signal to a null value at said second predetermined time duration.

* * * * *